(12) United States Patent
Verbin et al.

(10) Patent No.: US 8,837,268 B2
(45) Date of Patent: Sep. 16, 2014

(54) NETWORK-SPECIFIC POWERLINE TRANSMISSIONS

(75) Inventors: Rami Verbin, Tel-Aviv (IL); Ilan Reuven, Ramat Gan (IL); Reuven Franco, Tel-Aviv (IL)

(73) Assignee: Sigma Designs Israel S.D.I. Ltd., Tel Aviv (IL)

(*) Notice: Subject to any disclaimer, the term of this patent is extended or adjusted under 35 U.S.C. 154(b) by 600 days.

(21) Appl. No.: 12/814,512

(22) Filed: Jun. 14, 2010

(65) Prior Publication Data
US 2010/0315939 A1 Dec. 16, 2010

Related U.S. Application Data

(60) Provisional application No. 61/186,394, filed on Jun. 12, 2009.

(51) Int. Cl.
*H04B 3/54* (2006.01)
(52) U.S. Cl.
CPC ........ *H04B 3/542* (2013.01); *H04B 2203/5408* (2013.01)
USPC ............................ 370/201; 370/431; 370/462
(58) Field of Classification Search
None
See application file for complete search history.

(56) References Cited

U.S. PATENT DOCUMENTS

| | | | |
|---|---|---|---|
| 7,248,659 B2* | 7/2007 | Roberts | 375/355 |
| 7,830,907 B1 | 11/2010 | Petranovich et al. | |
| 8,154,918 B2* | 4/2012 | Sharon et al. | 365/185.02 |
| 2002/0113689 A1 | 8/2002 | Gehlot et al. | |
| 2004/0075535 A1* | 4/2004 | Propp et al. | 340/310.01 |
| 2005/0265220 A1* | 12/2005 | Erlich et al. | 370/208 |
| 2007/0165666 A1* | 7/2007 | Lifshitz et al. | 370/445 |
| 2009/0046593 A1 | 2/2009 | Ptasinski et al. | |
| 2009/0109945 A1 | 4/2009 | Lakkis | |
| 2010/0272192 A1* | 10/2010 | Varadarajan et al. | 375/257 |

OTHER PUBLICATIONS

ITU-T, G.9960, entitled "Series G: Transmission Systems and Media, Digital Systems and Networks: Unified high-speed wire-line based home networking transceivers—Foundation", Oct. 2009.
ITU-T, G.9960 Amendment 1, Unified high-speed wire-line based home networking transceivers, May-Jun. 2010.
European Search Report for corresponding EP application 10785841.7 mailed on Oct. 18, 2013.

* cited by examiner

*Primary Examiner* — Robert C Scheibel
(74) *Attorney, Agent, or Firm* — Eitan, Mehulal & Sadot

(57) ABSTRACT

A method for a network device of a powerline communications network includes selecting between a default preamble signal and a network-specific preamble signal specific to the network but not to a neighboring network and transmitting at least user data in conjunction with the selected preamble signal. Another method for a network device of a powerline communications network includes tuning a sensor to detect network-specific preamble signals specific to the network but not to a neighboring network and receiving at least user data associated with the preamble signals.

32 Claims, 3 Drawing Sheets

NETWORK-SPECIFIC POWERLINE TRANSMISSIONS

CROSS-REFERENCE TO RELATED APPLICATIONS

This application claims benefit from U.S. Provisional Patent Application 61/186,394, filed Jun. 12, 2009, which is hereby incorporated in its entirety by reference.

FIELD OF THE INVENTION

The present invention relates to powerline networks generally and to non-data signals of such networks in particular.

BACKGROUND OF THE INVENTION

Powerline networks operate by transmitting signals between network devices along the powerlines within a premises, such as a house, an office, an apartment etc. Powerline networks are considered desirable over other wired technologies, like coax or phoneline networks, because power exists in every room of a premises; there is no need to add additional wiring to reach the current location of the connected device.

Unfortunately, as shown in FIG. 1 to which reference is now made, powerlines in multi-dwelling buildings, such as office buildings, hotels, apartment buildings, etc., extend from one premises 10A to another premises 10B. While premises 10A may have its own network 16A and premises 10B may have its own network 16B, and while both premises 10 may have a switching board 11 (shown attached to a separating wall 12) which may connect the powerlines of a premises together, switching boards 11 also electrically connect the in-premises powerlines to the same main powerline 14.

Thus, a signal 18 sent from a PLC (powerline communications) node 20B, forming part of network 16B, to another PLC node somewhere in network 16B may travel along powerline 14 into network 16A of premises 10A (nodes 20 are shown as computers with the PLC units embedded therewithin). PLC node 20A, of network 16A, may receive a version of signal 18, as signal 18', even though signal 18' was not sent by any of the network devices in network 16A. In some cases, signal 18' may be attenuated to a level lower than signals 22 sent by network devices in network 16A. In other cases, signal 18' may not be much attenuated such that it can be received at levels exceeding those of signals sent by the devices within the network. In FIG. 1, signal 18' is shown with dotted lines while signals 18 and 22, sent within their respective networks, are shown with solid lines.

U.S. patent application Ser. No. 10/950,262, filed Sep 24, 2004, now U.S. Pat. No. 7,830,907, handles signals like signal 18' by coordinating the usage of network resources between the neighbouring networks. This approach is suitable for the case where the cross-talk signal level is high such that overlapping with the cross-talker must be avoided.

SUMMARY OF THE INVENTION

There is provided, in accordance with an embodiment of the present invention, a network device of a powerline communications network. The device includes a selector and a transmitter. The selector selects between a default preamble signal and a network-specific preamble signal specific to the network but not to a neighboring network. The transmitter transmits at least user data in conjunction with the selected preamble signal.

Moreover, in accordance with a preferred embodiment of the present invention, the device includes a sensor to check the network medium for transmissions using the network-specific preamble signal prior to transmitting.

Still further, in accordance with a preferred embodiment of the present invention, the device also includes a sequence generator and a preamble unit. The sequence generator generates a pseudo-random sequence and the preamble unit generates the network-specific preamble signals using the pseudo-random sequence.

For example, the sequence generator includes a linear feedback shift register initialized by a network seed.

Additionally, in accordance with a preferred embodiment of the present invention, the device also includes a seed selector to receive a domain identifier and to use the domain identifier to select the network seed from an active seed bank.

Moreover, in accordance with a preferred embodiment of the present invention, the network-specific preamble signal is at least near orthogonal to other network-specific preamble signals.

Further, in accordance with a preferred embodiment of the present invention, the device also includes a detectable signal unit to use the network-specific pseudo-random sequence for other detectable signals, such as priority resolution signals (PR) or ACK/NACK indications.

Still further, in accordance with a preferred embodiment of the present invention, the device also includes a default preamble generator to generate the default preamble signal from a default pseudo-random sequence and a transmitter to transmit information needed to facilitate admission of new nodes with the default preamble signal. For example, the information is a default media access plan.

Moreover, in accordance with a preferred embodiment of the present invention, the device includes a timing unit to activate the transmitter during an allocated carrier sensing timeslot for nodes with relatively low cross-talk level.

There is also provided, in accordance with a preferred embodiment of the present invention, a device for a network device of a powerline communications network. The device includes a sensor tuned to detect network-specific preamble signals specific to the network but not to a neighboring network and a receiver to receive at least user data associated with the preamble signals.

Moreover, in accordance with a preferred embodiment of the present invention, the receiver includes a pseudo-random sequence generator to generate a network-specific pseudo-random sequence with which to detect the network-specific preamble signals. For example, the receiver includes a linear feedback shift register initialized by a network seed.

Further, in accordance with a preferred embodiment of the present invention, the device also includes a seed selector to receive a domain identifier and to use the domain identifier to select the network seed from an active seed bank.

Still further, in accordance with a preferred embodiment of the present invention, the device also includes a detectable signal unit to use the network-specific pseudo-random sequence for other detectable signals. For example, the other detectable signals are priority resolution signals (PR) and ACK/NACK indications.

Additionally, in accordance with a preferred embodiment of the present invention, the device also includes a default preamble generator to generate the default preamble signal from a default pseudo-random sequence and a receiver to receive information needed to facilitate admission of new nodes to the network with the default preamble signal. For example, the information is a default media access plan.

Finally, in accordance with a preferred embodiment of the present invention, the device also includes a timing unit to activate the tuner during an allocated carrier sensing timeslot for nodes with relatively low cross-talk level.

The invention also includes methods implemented by the devices described hereinabove.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
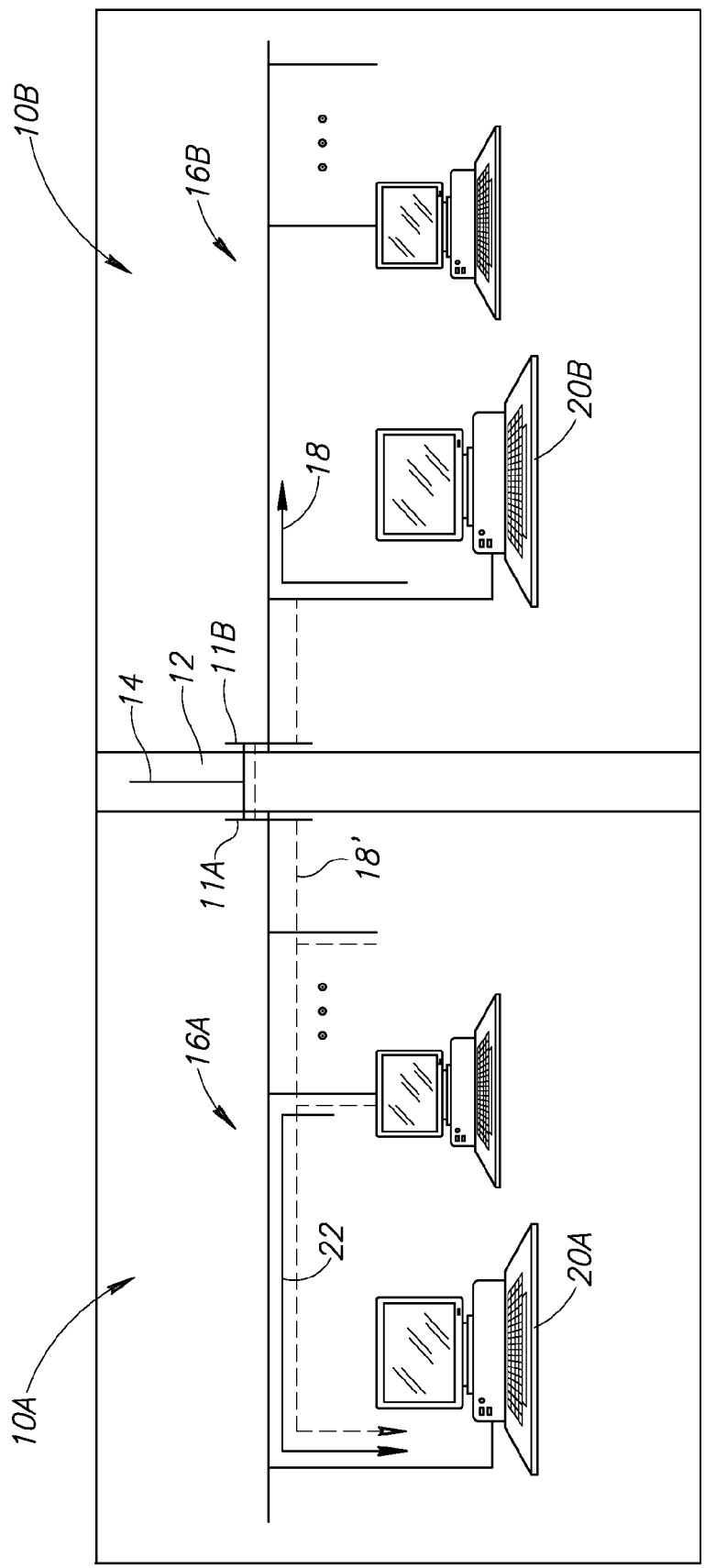
FIG. 1 is a schematic illustration of a two neighboring powerline networks.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In accordance with an embodiment of the present invention, signals from neighboring networks may be treated as noise. In this embodiment, each network operates independently, transmitting on the powerline according to its own schedule and after checking that the network medium (e.g. the powerline) is available. This approach is suitable for the case where the cross-talk signal level is relatively low, which is the case in many real life scenarios. It should be noted that this new approach may be integrated together with the previous TDM (time division multiplexing) approach. With this integrated mode, strong neighbors transmit during their own timeslots while weak neighbors may share timeslots with the main network.

Applicants have realized that, when devices in neighboring networks can detect each other's signals, even if the devices know to ignore the signals from the neighboring networks, there is a significant overhead in handling such interfering signals.

Figure 2:
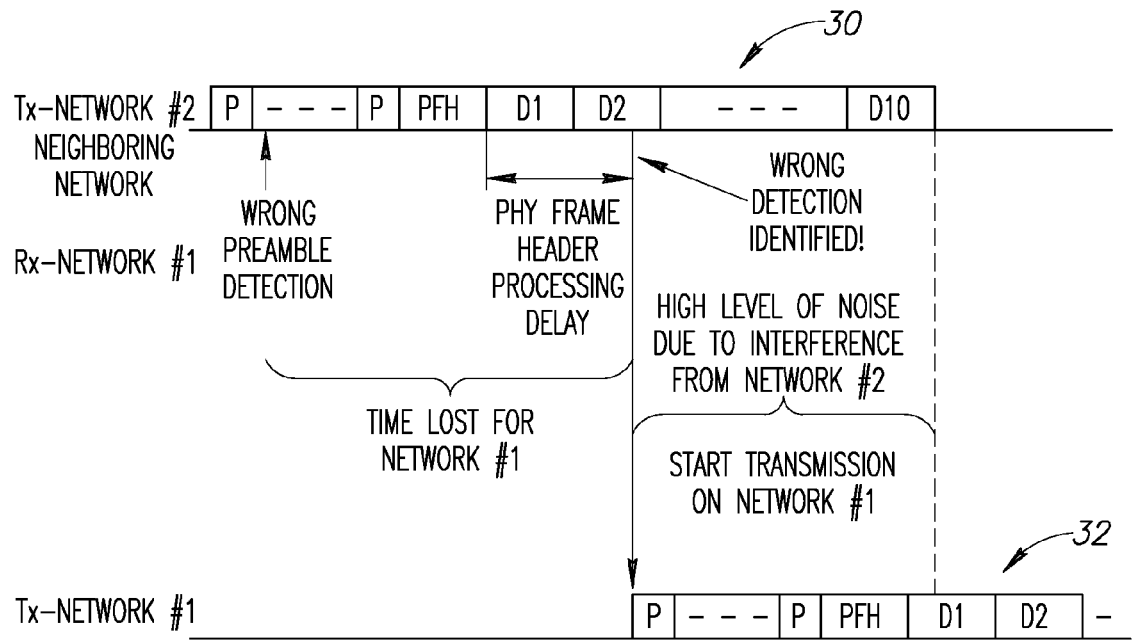
FIG. 2 is a timing diagram of prior art transmissions in a central network and a neighboring network according to a prior art method of transmission.

FIG. 2, to which reference is now made, shows two frames, a frame 30 from a neighboring network, labeled network 2, and a subsequent frame 32 by a device in the main network, labeled network 1. Each frame is formed of a preamble P, a physical layer (PHY) header PFH, and payloads, shown as packets D1-D10.

Due to the strength of frame 30 from neighbouring network 2, its preamble P will be detected by any device in main network 1. Since the device of main network 1, for example, device 20A of FIG. 1, does not know that frame 30 is from a different network, device 20A may begin processing frame 30. Device 20A may continue to process frame 30 until it figures out that the frame does not belong to its network. As shown in FIG. 2, this does not occur until the PHY (physical) header has been fully processed. This "PHY header delay" may continue during the frame of at least one packet D1. Once device 20A determines that frame 30 does not originate from its network, device 20A may stop processing frame 30 and may "open" its receiver again for other frames.

It will be appreciated that the false preamble detection "blinds" the receiver for a time period comprising of the following elements:

1) Preamble length, minus the time period for preamble detection. The detection time is relatively short, so this period may be roughly approximated to 1 preamble element (also known in some technologies as a mini symbol);
2) PHY-frame header—one symbol long; and
3) Processing of the PHY-frame header, i.e., FFT, frequency domain processing, decoding and parsing. This may last 1-2 symbols.

The resultant "dead period" is of 3-4 symbols long, where the exact number depends on the exact implementation details. This dead period has two effects:

1) The receiver is "blind" to frames of its own network during this time period and may miss them entirely; and
2) The node cannot transmit during this time period even though it may be scheduled to transmit during this period. The node has to assume that the received transmission originates from its own network so that it cannot start with a new transmission until the wrong detection becomes evident.

If we consider the case where both networks (the main network and the neighbouring network) are fully loaded, the resulting loss might be about 3-4 symbols. Let's denote by $N_B$, this blindness period (in OFDM symbols) and by $N_F$, the frame duration (in OFDM symbols). Now, if we assume that both networks use roughly the same frame size and that they are not synchronized, i.e., the start of frame of one network occurs at a random location within the frame of the other network, then the average loss of frames due to the blindness period amounts to $N_B/N_F$. For an average frame duration of 1 ms, this rate loss may reach 15%-20%.

Applicants have realized that reducing the blindness period may increase performance of both networks. In accordance with an embodiment of the present invention, transmissions from other neighbouring networks may be differentiated from transmissions from the same network by transmitting signals which require detection, such as the preamble of any frame, modulated or generated differently according to the network to which it belongs. The modulations may be designed to be orthogonal or near-orthogonal (i.e. such that the effect of a neighboring signal on a receiver tuned to detect another signal will be substantially reduced since orthogonal signals are not correlated to each other) to improve the immunity of transceivers to cross-talk from neighbouring networks.

Other signals may also benefit from orthogonal modulation. In the G.hn standard, as described in ITU-T G.9960 Amendment 1 "Unified high-speed wire-line based home networking transceivers", May-June 2010, these may be the Priority Resolution Signals (PR), acknowledgment (ACK) or NACK signals and potentially others, like the INUSE indication.

In accordance with an embodiment of the present invention, it is sufficient only to change the preamble signal. As previously described, carefully selecting and allocating preamble signals per network reduces the chance of detecting preambles from neighboring networks. The remainder of the frame, i.e. everything other than the preamble, may be transmitted with the same modulation as in other networks.

It will be appreciated that, by differentiating preambles and other detected signals between neighboring networks, each device 20 may be "tuned" to its own network, substantially ignoring signals from other networks. This is illustrated in FIG. 3, to which reference is now briefly made.

Figure 3:
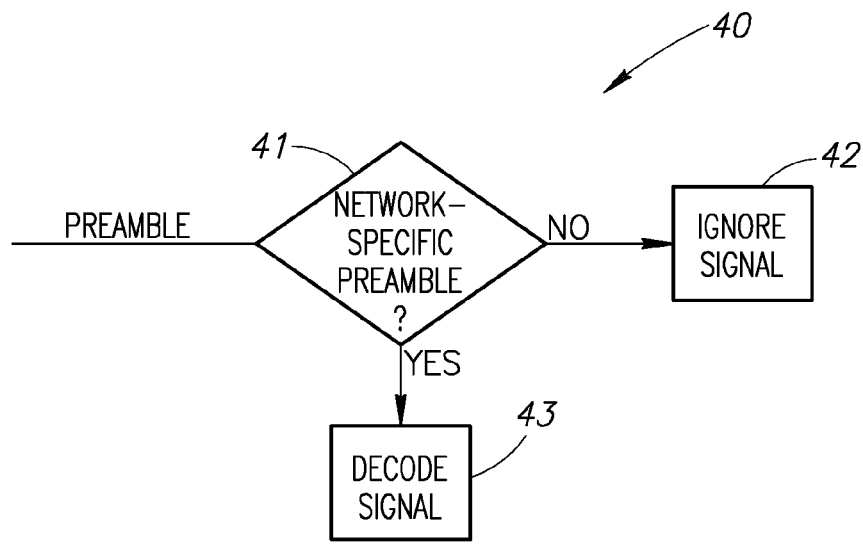
FIG. 3 is a flow chart illustration of a signal detector, constructed and operative in accordance with a preferred embodiment of the present invention.

FIG. 3 shows the operations of a signal detector 40 which receives signals from the powerline network. Due to the near orthogonality of the signals which require detection, signal detector 40 may be tuned to the particular modulation of its network, ignoring (step 42) signals which do not have its network-specific preamble and passing (step 43) only signals which have the network-specific preamble to PLC device 20. As long as the signal received from a neighboring network is not overly strong, or if it was significantly distorted by the channel, signal detector 40 will not detect these neighboring signals. It should be noted that various detector schemes exist and are incorporated within the present invention which can utilize the difference between the signals for detection. Each scheme may have its own advantages and disadvantages.

Figure 4:
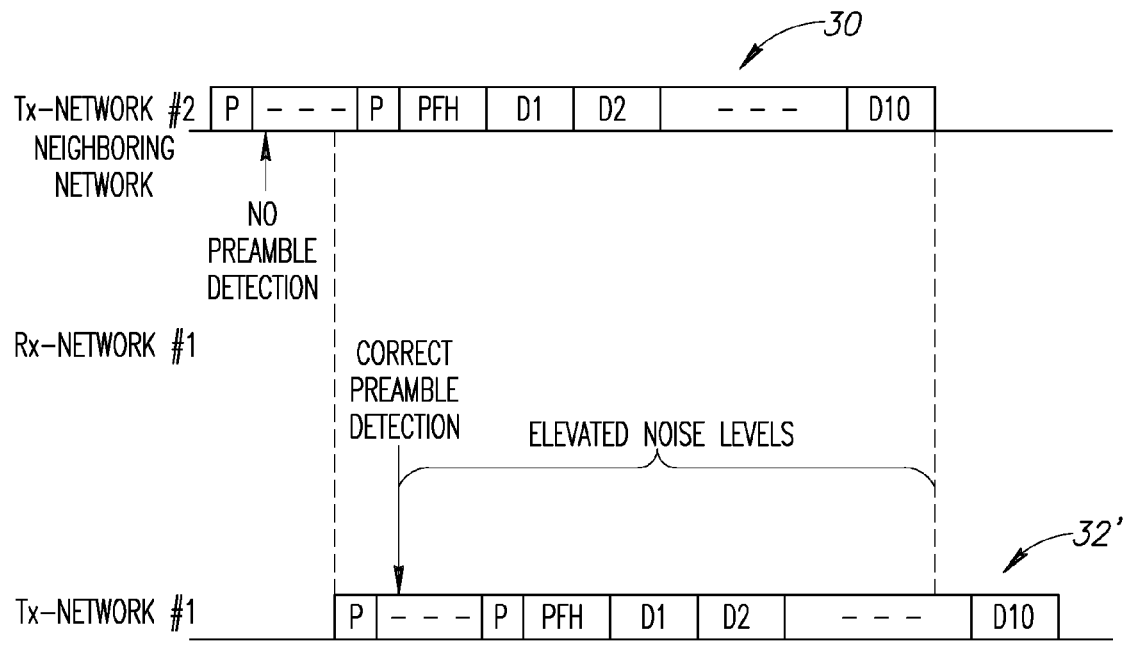
FIG. 4 is a timing diagram of transmissions in the central and neighboring networks of FIG. 2 using the signal detector of FIG. 3.

FIG. 4, to which reference is now made, shows the result of this orthogonal modulation. When neighboring network 2 transmits its frame 30 (the same frame as in FIG. 2), it is "ignored" by network 1 (i.e. network 1 does not begin detecting the preamble of frame 30), since the modulation of frame 30 is the modulation of network 2 and not of network 1. Network 2 may transmit its frame, here labeled 32', when it is ready to do so. When comparing FIGS. 2 and 4, it may be seen that frame 32' (FIG. 4) may be received and processed earlier than frame 32 (FIG. 2), because network 1 does not waste time detecting the preamble of frame 30.

Furthermore, in the present invention, there is no blindness period, and, as a result, devices do not miss transmissions from other devices in the native network that would not have been detected due to the blindness period.

As indicated in both FIGS. 2 and 4, there are elevated noise levels for each network for the duration of concurrent transmission. However, the present invention may be useful for those scenarios where the interference level from the neighbors as measured by the SNR, or the SINR (Signal-to-interference-level) which is the difference between a signal level of a main network and the level of noise and interference from its neighbours, is such that the receivers of devices of the main network are still able to decode the header and payload of nodes of the main network.

In accordance with an embodiment of the present invention, the near orthogonality between signals from neighboring networks may be generated by careful selection of pseudo-random sequences used to generate or modulate the appropriate signals.

It will be appreciated that a pseudo-random sequence generator is designed for generating a sequence of numbers that approximates the properties of random numbers. This pseudo-random sequence generator may generate different number sequences depending on its initialization. This initial state of the random generator is commonly referred to as the "seed" of the random sequence. Since different seeds generate different sequences, it is sufficient to have a set of seeds known to produce near orthogonal signals based on these sequences and to ensure that neighboring networks choose different seeds.

Any pseudo-random sequence generator may be utilized. For example, a linear feedback shift register (LFSR) may be utilized. An LFSR is a shift register having X bits. When used for generating pseudo-random sequences, the LFSR begins operation from a starting state defined by the seed. At each cycle, the LFSR shifts the data stored therein by 1 or more bits and receives an input bit which is a linear function of its previous state.

The emerging G.hn standard is described in ITU-T, G.9960, entitled "Series G: Transmission Systems and Media, Digital Systems and Networks: Unified high-speed wire-line based home networking transceivers—Foundation", October 2009, and in draft documents prior to October 2009. It utilizes a pseudo-random sequence generator for various operations, such as a constellation scrambler, which sequence generator may be utilized for the present invention as well. Other pseudo-random sequence generators may also be utilized.

Figure 5:
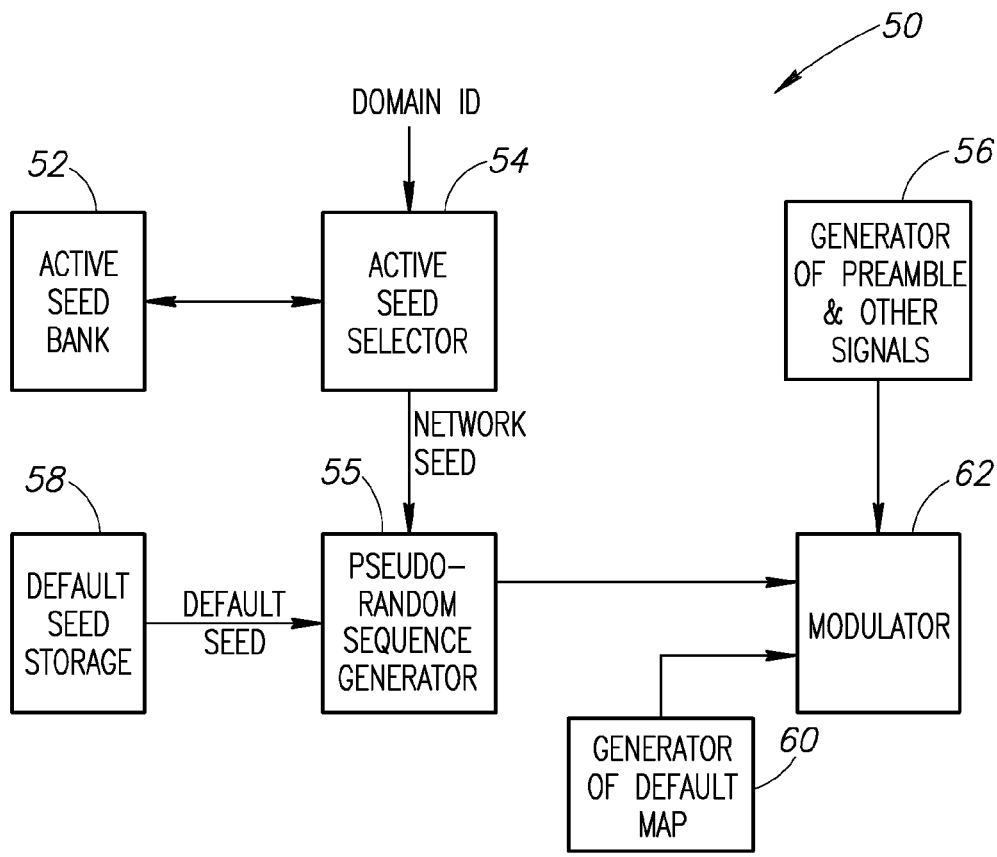
FIG. 5 is a block diagram illustration of a signal transmitter operative with the signal detector of FIG. 3.

Reference is now made to FIG. 5, which illustrates a transmitter 50 of each network device (which might be PLC node 20 or a unit separate from device 20 for handling network traffic). Transmitter 50 may comprise an active seed bank 52, an active seed selector 54 and a default seed storage unit 58 feeding a pseudo-random sequence generator 55 which is operative to generate a pseudo-random sequence given a seed. Transmitter 50 may also comprise a signal generator 56, a default MAP (media access plan) generator 60, and a modulator 62.

Active seed bank 52 may store a table of seeds for generating pseudo-random sequences. The seeds may be selected such that any two of the resultant transmit signals generated by the pseudo-random sequences may be orthogonal or close to orthogonal.

Active seed selector 54 may select a current (or "active") seed for pseudo-random generator 55 from one of a set of active seeds stored in active seed bank 52. To reduce the likelihood that neighboring networks might select the same 'active' seed, selector 54 may associate seeds with domain IDs (identifiers), where each network has a different domain ID. Thus, active seed selector 54 may receive the domain ID for the current network and may utilize it to access the associated seed from seed bank 52. Alternatively, the active seed may be selected by sequentially picking a seed and evaluating its performance against signals received from neighboring networks in the field.

Active seed selector 54 may provide the appropriate seed to pseudo-random sequence generator 55 to generate the resultant pseudo-random sequence which, in turn, may be utilized by modulator 62 to modulate the constellation points of the preambles, INUSE, PR, NACK or any other detectable signals generated by signal generator 56. Typically, modulator 62 may rotate the constellation points corresponding to the detectable signals in accordance with the bits of the pseudo-random sequence.

In accordance with an alternative embodiment of the present invention, the pseudo-random sequence may be used to generate the preamble signal itself or in any other way known to one skilled in the art.

Since the preamble and other detectable signals are known a priori, upon reception, a demodulator of signal detector 40 (FIG. 3) may cross-correlate the received signal (i.e. the preamble, etc.) with the a priori known information of the transmitted signal, thereby demodulating the preamble from the near orthogonal modulation. It should be noted that multiple methods exist in the art for detecting a preamble signal and the above mentioned methods are just examples.

It will be appreciated that the different seeds enable the separate networks to create at least network-specific preambles thereby to differentiate themselves from each other. This increases the efficiency of operation of the networks as it better isolates them from one another.

However, new nodes which have just joined the network are not familiar with the seed currently used in the domain and cannot immediately start operating upon connecting to the network. To cope with this case, existing nodes may, from time to time, utilize a default seed to create default preambles thereby to generate and transmit specific messages needed for admission and configuration of new nodes.

For example, the default MAP (media access plan) may be transmitted with a default preamble generated from a default seed, stored in default seed storage unit 58 and provided to all devices at manufacture or power-up. Pseudo-random sequence generator 55 may generate a sequence using the default seed and modulator 62 may utilize the resultant sequence to modulate or generate the preamble of the default MAP message, produced by default MAP generator 60. Thus, any device, even one which does not know the domain ID, may listen to the powerline medium and may decode the preamble and the default MAP, when they are transmitted, simply by using the sequence of the default seed. If the new device knows the domain ID, it can then configure itself according to the information in any default MAP message having the domain ID.

In addition, each MAP may include an indication of which type of seed may be used per transmission opportunity or TXOP. TXOP stands for a time interval with specific allocation features. The indication may be provided in a "TXOP Attributes Extension Data format" specified for MAPS in the G.hn standard and may be a 1 bit flag to indicate whether the messages transmitted in this TXOP use 'default' or 'active' seeds. This is used to mark the TXOP in which a default MAP (MAP-D) is transmitted (in this TXOP the 'default' seed is used for all messages).

With the elements shown above, the following operations may occur:

Admission of a New Node to a domain:

A new node, trying to join the network, listens to the powerline medium and tries to detect MAP-D transmissions using the default preamble signal (which may be generated using the default seed). After detection of a MAP-D transmission and after decoding its content, the new node acquires the knowledge regarding use of either 'default' or 'active' seeds in subsequent TXOPs.

If required, the node switches to the 'active' seed of the domain, based on the Domain_ID (in specific TXOPs as indicated by the "TXOP Attributes Extension Data format" field). The node utilizes the active seed both to generate signals for transmission and to demodulate received signals.

Behaviour of Nodes Already Registered to the Network:

An already registered node uses the "TXOP Attributes Extension Data" field of each MAP to acquire knowledge regarding use of either 'default' or 'active' seeds in TXOPs of the MAC cycle. The node then utilizes the relevant seed to generate the relevant pseudo-random sequences with which to check the network medium for transmissions using the network-specific preamble signal, both for reception and prior to transmitting its own transmissions using the network-specific preamble signal.

Except for the TXOP used to deliver MAP-D, which is mandated to use the 'default' seed, usage of either 'default' or 'active' seeds in all other TXOPs is left to vendor discretion.

It should be noted that the above description is just one possible example of how to manage the use of seeds along the transmitted MAC cycle of a node, combining the active seed and the default seed. The present invention incorporates all such embodiments.

For example, the present invention may be implemented with TDMA (time division multiple access) allocations: there may be dedicated allocations for networks/nodes that create high levels of cross talk and at least one other time allocation for all nodes with relatively low cross-talk level.

Unless specifically stated otherwise, as apparent from the preceding discussions, it is appreciated that, throughout the specification, discussions utilizing terms such as "processing", "computing", "calculating", "determining" or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for a network device of a powerline communications network, the method comprising:

in accordance with instructions provided within a MAP (Media Access Plan), selecting between a default preamble signal used at least to facilitate admission of new nodes to said network and a network-specific preamble signal specific to said network but not to a neighboring network; and transmitting a PHY (physical layer) frame having said selected preamble signal.

2. The method according to claim 1 and also comprising checking the network medium for transmissions using said network-specific preamble signal prior to said transmitting.

3. The method according to claim 1 and also comprising generating said network-specific preamble signals using a pseudo-random sequence.

4. The method according to claim 3 and also comprising generating said pseudo-random sequence with a linear feedback shift register initialized by a network seed.

5. The method according to claim 4 and also comprising receiving a domain identifier and using said domain identifier to select said network seed from an active seed bank.

6. The method according to claim 1 and wherein said network-specific preamble signal is at least near orthogonal to network-specific preamble signals of neighboring networks.

7. The method according to claim 3 and also comprising using said network-specific pseudo-random sequence to modulate other detectable signals.

8. The method according to claim 7 and wherein said other detectable signals comprise at least one of the following types of signals: priority resolution signals (PR) and ACK/NACK indications.

9. The method according to claim 1 and also comprising having one or more allocated timeslots to one or more neighboring networks wherein said transmitting occurs during an allocated carrier sensing timeslot for nodes with relatively low cross-talk level.

10. A method for a network device of a powerline communications network, the method comprising:
in accordance with instructions provided within a MAP, tuning a sensor to detect either a network-specific preamble signal specific to said network but not to a neighboring network or a default preamble signal used at least to facilitate admission of new nodes to said network; and
receiving a PHY (physical layer) frame having one of said preamble signals.

11. The method according to claim 10 and wherein said receiving comprises generating a network-specific pseudo-random sequence with which to detect said network-specific preamble signals.

12. The method according to claim 11 and also comprising generating said pseudo-random sequence with a linear feedback shift register initialized by a network seed.

13. The method according to claim 12 and also comprising receiving a domain identifier and using said domain identifier to select said network seed from an active seed bank.

14. The method according to claim 11 and also comprising using said network-specific pseudo-random sequence to detect other detectable signals.

15. The method according to claim 14 and wherein said other detectable signals comprise at least one of the following types of signals: priority resolution signals (PR) and ACK/NACK indications.

16. The method according to claim 10 and also comprising having one or more allocated timeslots to one or more neighboring networks and wherein said tuning occurs during an allocated carrier sensing timeslot for nodes with relatively low cross-talk level.

17. A network device of a powerline communications network, the device comprising:
a selector to select in accordance with instructions provided within a MAP between a default preamble signal used at least to facilitate admission of new nodes to said network and a network-specific preamble signal specific to said network but not to a neighboring network; and
a transmitter to transmit a PHY (physical layer) frame having said selected preamble signal.

18. The device according to claim 17 and also comprising a sensor to check the network medium for transmissions using said network-specific preamble signal prior to transmitting.

19. The device according to claim 17 and also comprising:
a sequence generator to generate a pseudo-random sequence; and
a preamble unit to generate said network-specific preamble signals using said pseudo-random sequence.

20. The device according to claim 19 and wherein said sequence generator comprises a linear feedback shift register initialized by a network seed.

21. The device according to claim 20 and also comprising a seed selector to receive a domain identifier and to use said domain identifier to select said network seed from an active seed bank.

22. The device according to claim 17 and wherein said network-specific preamble signal is at least near orthogonal to other network-specific preamble signals.

23. The device according to claim 19 and also comprising a detectable signal unit to use said network-specific pseudo-random sequence for other detectable signals.

24. The device according to claim 23 and wherein said other detectable signals comprise at least one of the following types of signals: priority resolution signals (PR) and ACK/NACK indications.

25. The device according to claim 17 and also comprising a timing unit to activate said transmitter during an allocated carrier sensing timeslot for nodes with relatively low cross-talk level.

26. A device for a powerline communications network, the device comprising:
a sensor tunable in accordance with instructions provided within a MAP to detect either a network-specific preamble signal specific to said network but not to a neighboring network or a default preamble signal used at least to facilitate admission of new nodes to said network; and
a receiver to receive a PHY (physical layer) frame having one of said preamble signals.

27. The device according to claim 26 and wherein said receiver comprises a pseudo-random sequence generator to generate a network-specific pseudo-random sequence with which to detect said network-specific preamble signals.

28. The device according to claim 27 and wherein said receiver comprises a linear feedback shift register initialized by a network seed.

29. The device according to claim 28 and also comprising a seed selector to receive a domain identifier and to use said domain identifier to select said network seed from an active seed bank.

30. The device according to claim 27 and also comprising a detectable signal unit to use said network-specific pseudo-random sequence for other detectable signals.

31. The device according to claim 30 and wherein said other detectable signals comprise at least one of the following types of signals: priority resolution signals (PR) and ACK/NACK indications.

32. The device according to claim 26 and also comprising a timing unit to activate said tuner during an allocated carrier sensing timeslot for nodes with relatively low cross-talk level.

* * * * *